(12) United States Patent
Cunico et al.

(10) Patent No.: US 10,831,870 B2
(45) Date of Patent: Nov. 10, 2020

(54) INTELLIGENT USER IDENTIFICATION

(71) Applicant: INTERNATIONAL BUSINESS MACHINES CORPORATION, Armonk, NY (US)

(72) Inventors: Hernan A. Cunico, Holly Springs, NC (US); Martin G. Keen, Cary, NC (US); Richard D. Johnson, Raleigh, NC (US); Paul A. R. Frank, Hamberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

(21) Appl. No.: 16/115,181

(22) Filed: Aug. 28, 2018

(65) Prior Publication Data

US 2020/0074052 A1    Mar. 5, 2020

(51) Int. Cl.
 G06F 7/04        (2006.01)
 G06F 15/16       (2006.01)
 H04L 29/06       (2006.01)
 G06F 21/31       (2013.01)
 G06F 21/45       (2013.01)
 G06F 16/332      (2019.01)
 G06F 40/30       (2020.01)
 G06F 40/205      (2020.01)
 G06F 40/284      (2020.01)

(52) U.S. Cl.
 CPC .......... *G06F 21/31* (2013.01); *G06F 16/3329* (2019.01); *G06F 21/45* (2013.01); *G06F 40/205* (2020.01); *G06F 40/284* (2020.01); *G06F 40/30* (2020.01); *G06F 2221/2103* (2013.01)

(58) Field of Classification Search
 CPC .. G06F 21/31; G06F 16/33229; G06F 40/205; G06F 40/30; G06F 21/45; G06F 221/2103; G06F 16/3229; G06F 2221/2103
 See application file for complete search history.

(56) References Cited

U.S. PATENT DOCUMENTS

| 8,955,058 | B2 | 2/2015 | Castro et al. |
| 9,565,562 | B1 | 2/2017 | Bar-Menachem et al. |
| 9,888,377 | B1 | 2/2018 | McCorkendale et al. |
| 2004/0083394 | A1* | 4/2004 | Brebner ............... G06Q 20/382 726/19 |
| 2006/0047615 | A1* | 3/2006 | Ravin .................... G06N 5/022 706/50 |

(Continued)

OTHER PUBLICATIONS

Anonymous, "System and Method for step-up/multi-factor authentication leveraging mobile device management analytics," An IP.com Prior Art Database Technical Disclosure, IPCOM000241524D, May 8, 2015 (5 pages).

*Primary Examiner* — John B King
*Assistant Examiner* — Darshan I Dhruv
(74) *Attorney, Agent, or Firm* — Griffiths & Seaton PLLC

(57) ABSTRACT

Embodiments for implementing intelligent user identification by a processor. A temporary abstraction model may be created. One or more user specific verification queries may be generated according to the temporary abstraction model. A user identify may be asserted for accessing an application upon validating one or more user responses in relation to the one or more user specific verification queries.

20 Claims, 6 Drawing Sheets

(56) References Cited

U.S. PATENT DOCUMENTS

| | | | |
|---|---|---|---|
| 2011/0289081 A1* | 11/2011 | Willits | G06F 16/24522 707/728 |
| 2012/0214442 A1 | 8/2012 | Crawford et al. | |
| 2013/0036461 A1 | 2/2013 | Lowry | |
| 2013/0067547 A1* | 3/2013 | Thavasi | G06F 21/31 726/7 |
| 2013/0133055 A1 | 5/2013 | Ali et al. | |
| 2013/0160098 A1* | 6/2013 | Carlson | H04L 63/0876 726/6 |
| 2013/0191898 A1* | 7/2013 | Kraft | G06F 21/31 726/6 |
| 2013/0318580 A1* | 11/2013 | Gudlavenkatasiva | H04L 63/168 726/7 |
| 2014/0189829 A1* | 7/2014 | McLachlan | H04L 63/08 726/6 |
| 2015/0006537 A1* | 1/2015 | Jenkins | G06F 16/358 707/740 |
| 2015/0128240 A1* | 5/2015 | Richards | H04W 12/0608 726/7 |
| 2015/0178345 A1* | 6/2015 | Carrier | G06F 16/35 707/691 |
| 2015/0188898 A1* | 7/2015 | Chow | H04L 63/08 726/7 |
| 2015/0279366 A1* | 10/2015 | Krestnikov | G10L 15/22 704/235 |
| 2015/0371020 A1* | 12/2015 | Yin | H04L 63/08 726/30 |
| 2016/0057110 A1* | 2/2016 | Li | G06F 21/316 726/7 |
| 2016/0132673 A1* | 5/2016 | Birk | G06F 21/30 726/19 |
| 2016/0315929 A1* | 10/2016 | Childress | H04W 12/06 |
| 2017/0140288 A1* | 5/2017 | Pourshahid | G06N 5/022 |
| 2017/0220940 A1* | 8/2017 | Shaashua | G06N 20/00 |
| 2017/0255987 A1* | 9/2017 | Bacharach | G06Q 30/0631 |
| 2018/0052981 A1* | 2/2018 | Nygate | G06F 21/316 |
| 2018/0246944 A1* | 8/2018 | Yelisetti | G06F 16/258 |
| 2019/0278871 A1* | 9/2019 | Matsuzaki | G06F 40/18 |
| 2019/0354659 A1* | 11/2019 | Barillari | G06F 16/5838 |

\* cited by examiner

INTELLIGENT USER IDENTIFICATION

BACKGROUND OF THE INVENTION

Field of the Invention

The present invention relates in general to computing systems, and more particularly to, various embodiments for implementing intelligent user identification by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products. As great strides and advances in technologies come to fruition, these technological advances can be then brought to bear in everyday life.

SUMMARY OF THE INVENTION

Various embodiments for a system of implementing intelligent user identification, using one or more processors, are provided. In one embodiment, by way of example only, a method for implementing intelligent user identification, again by a processor, is provided. A temporary abstraction model may be created. One or more user specific verification queries may be generated according to the temporary abstraction model. A user identify may be asserted for accessing an application upon validating one or more user responses in relation to the one or more user specific verification queries.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
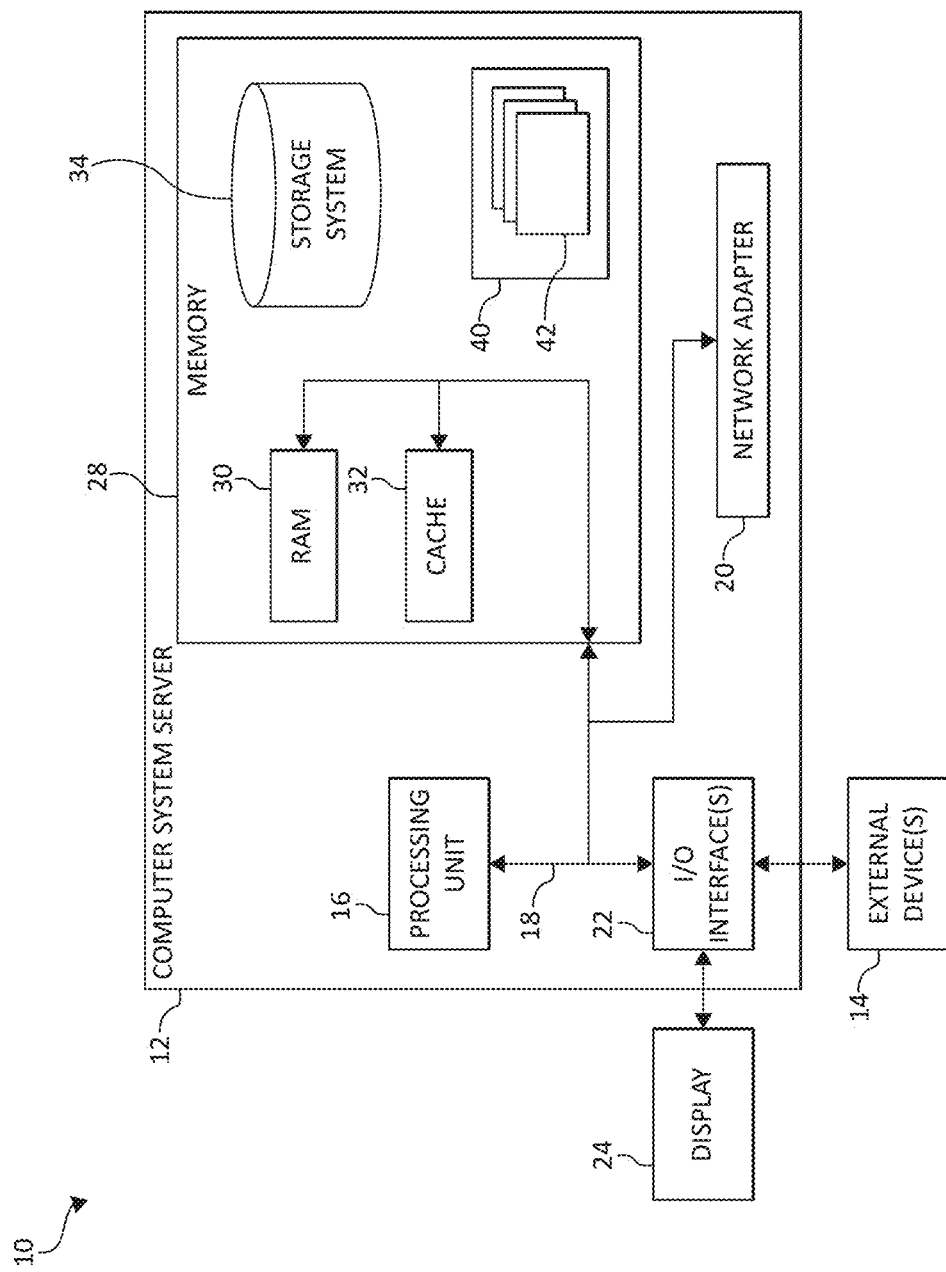
FIG. 1 is a block diagram depicting an exemplary computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

In many computing environments such as, for example, in cloud computing and IoT computing environments, authentication is the process of determining whether someone or something is, in fact, who or what it is declared to be. In various computer networks, authentication is commonly performed through the use of logon passwords. Knowledge of the password is assumed to guarantee that the user is authentic. Each user registers initially (or is registered by someone else), using an assigned or self-declared password. On each subsequent use, the user must know and use the previously declared password. One primary weakness in this approach is that passwords can be stolen, accidentally revealed, or even forgotten. For example, a username and password credentials may be insufficient and not strong enough to protect various resources. A "secondary user validation" may be required to provide additional information about the user to further validate the identity of the user. The extra validation can be a personal question that the user previously answered at a registration time or to provide an available security code. However, the challenge with these types of validation is that the user is required to provide the answer to a series of pre-established questions. These questions and answers are static and usually tied to a specific point in time. For example, common questions include a mother's maiden name, a name of a pet, a brand of a favorite car, and/or name of a school attended. Many times, the information may be known by more people than just the user being validated. In other cases, the user may not even remember the answer to the question.

Accordingly, the present invention provides a solution to increase effectiveness when such validations are required. Therefore, the mechanism of the illustrated embodiments validate a user by associating circumstantial, temporal information known only to the specific individual. In one aspect, one or more user specific verification queries may be dynamically formulated using circumstantial, user specific questions based on the temporary abstraction model. The user identity may be asserted by validating user responses against dynamically generated, user specific questions.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
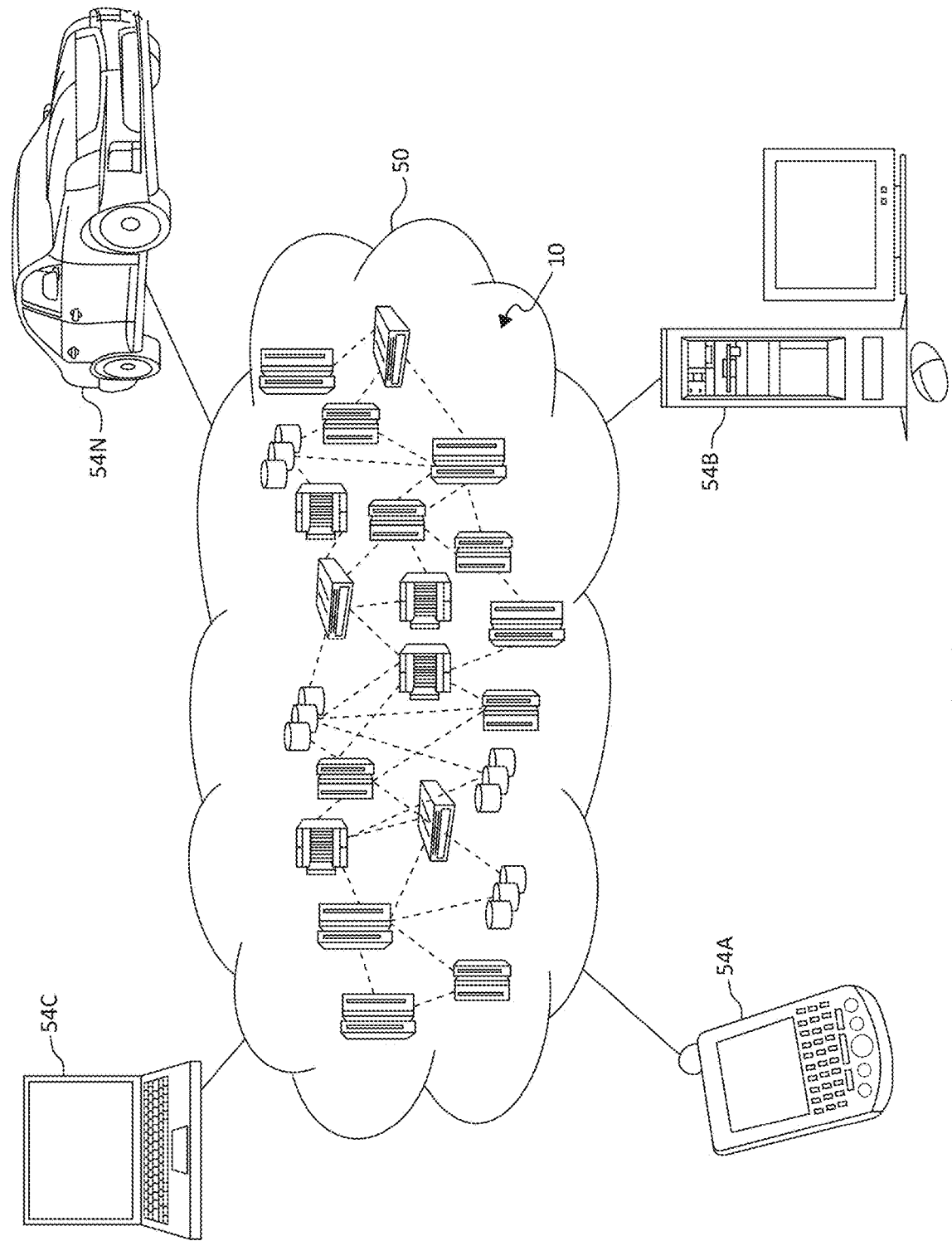
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
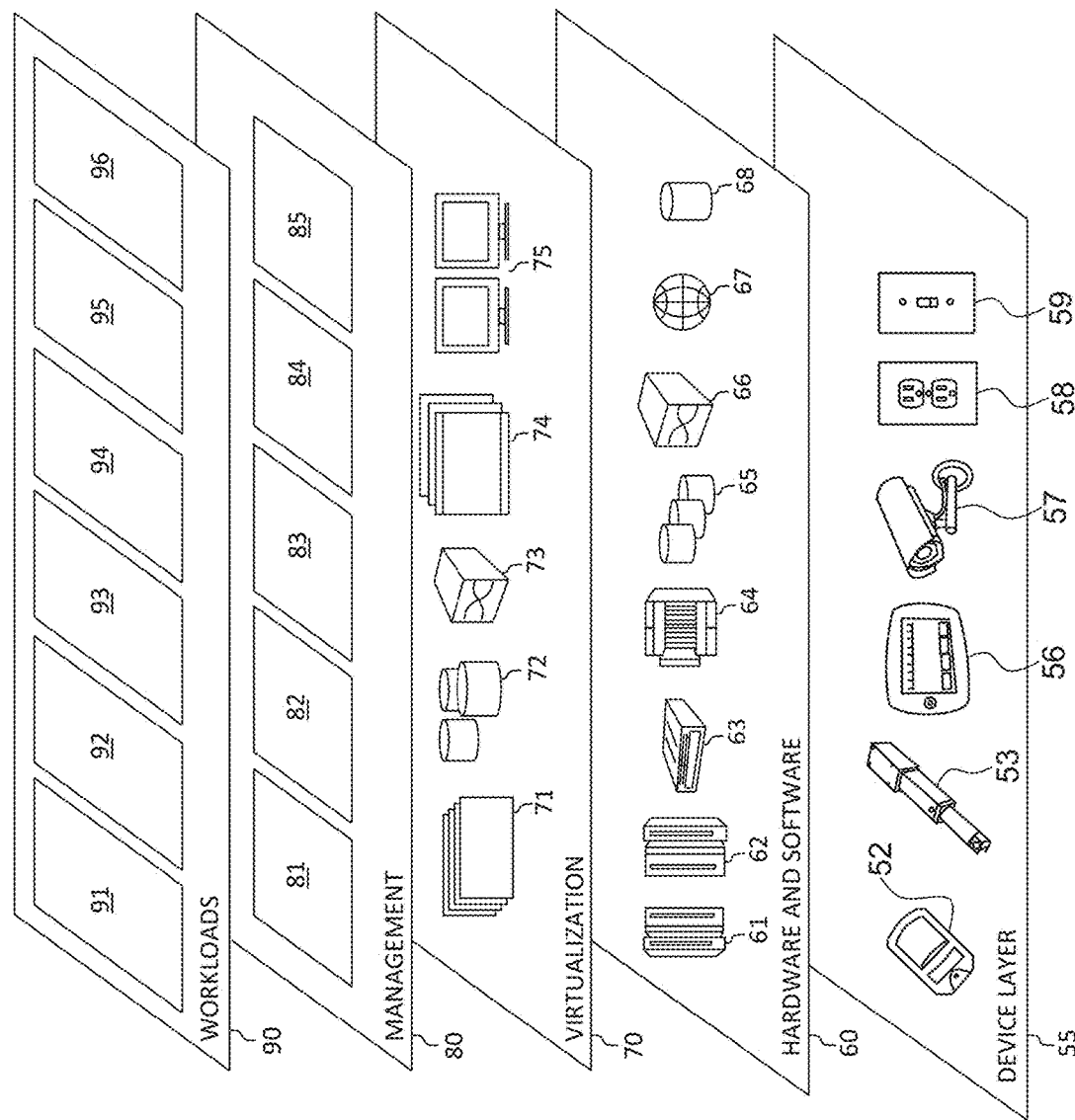
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for implementing intelligent user identification. In addition, workloads and functions 96 for implementing intelligent user identification may include such operations as data analytics, data analysis, and as will be further described, notification functionality. One of ordinary skill in the art will appreciate that the workloads and functions 96 for implementing intelligent user identification may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
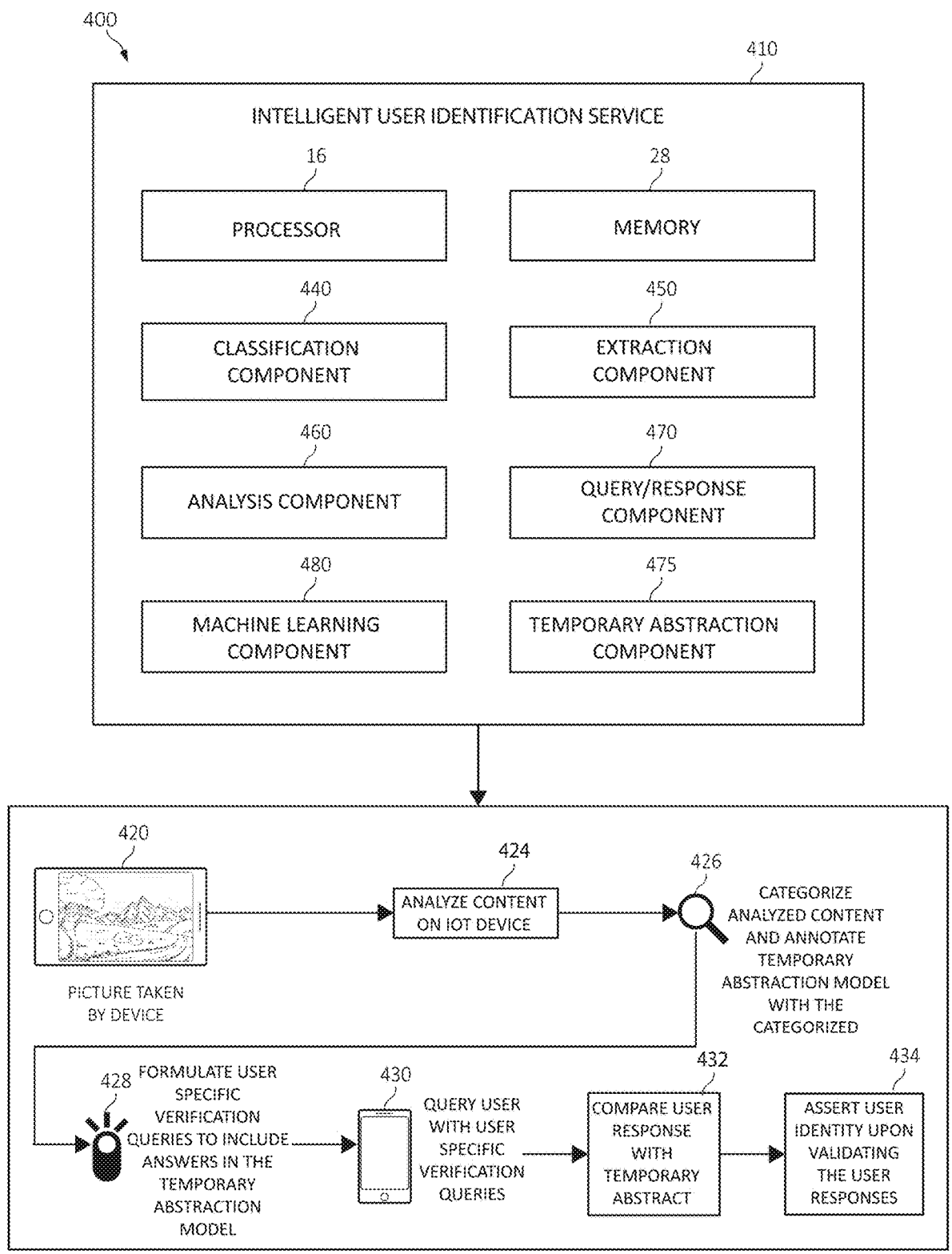
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates a system 400 (e.g., a cognitive system) for intelligent user identification processing in an IoT computing environment. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for intelligent user identification in accordance with the present invention. Many of the functional blocks 400 may execute as background processes on various components, either in distributed computing components, or on the user device, or elsewhere.

An intelligent user identification service 410 is shown, incorporating processing unit 16 ("processor") and memory 28 of FIG. 1 to perform various computational, data processing and other functionality in accordance with various aspects of the present invention. The intelligent user identification service 410 may be provided by the computer system/server 12 of FIG. 1.

As one of ordinary skill in the art will appreciate, the depiction of the various functional units in the intelligent user identification service 410 is for purposes of illustration, as the functional units may be located within the intelligent user identification service 410 or elsewhere within and/or between distributed computing components.

The intelligent user identification service 410 may be in communication with and/or association with a user equipment 420 ("UE") (e.g., an internet of things "IoT" computing device such as, for example, a camera, smartphone, desktop computer, laptop computer, tablet, and/or another electronic device that may have one or more processors and memory and configured for capturing images or video data). The UE 420 and the intelligent user identification service 410 may each be associated with and/or in communication with each other, by one or more communication methods, such as a computing network, wireless communication network, or other network means enabling communication.

In one aspect, the intelligent user identification service 410 may provide virtualized computing services (i.e., virtualized computing, virtualized storage, virtualized networking, etc.) to the one or more UEs such as, for example, UE 420. More specifically, the intelligent user identification service 410 may provide, and/or be included in, a virtualized computing, virtualized storage, virtualized networking and other virtualized services that are executing on a hardware substrate.

The intelligent user identification service 410 may also function as a database and/or service that may store, maintain, and update data, services, and/or resources internal to and/or external to a cloud computing environment such as described in FIG. 2. In one aspect, the intelligent user identification service 410 may assist in providing access to one or more various types of data, services and/or resources.

In one aspect, the intelligent user identification service 410 may provide a classification component 440, an extraction component 450, an analysis component 460, a query/response component 470, a temporary abstraction component 475, and a machine learning component 480.

The temporary abstraction component 475 may cognitively create a temporary abstraction model. The analysis component 460 may analyze data from one or more Internet of Things ("IoT") computing devices such as, for example, UE 420 using a lexical analysis, parsing, extraction of concepts, semantic analysis, or a combination thereof. The analysis of the data from one or more IoT computing devices may occur prior to extracting the data and/or subsequent to extracting the data. The analysis component 460 may be remotely located from the UE 420 and/or locally installed on the UE 420 and in communication with intelligent user identification service 410.

The extraction component 450 may extract the analyzed data from the UE 420 using artificial intelligence logic, such as natural language processing (NLP) based logic, Optical Character Recognition (OCR), and/or other machine learning logic. The extraction component 450 may be remotely located from the UE 420 (e.g., an image capturing device) and/or locally installed on the UE 420 and in communication with the intelligent user identification service 410.

The classification component 440 may categorize the extracted data according to content and characteristics and then annotate the temporary abstraction model with the data categorized according to the content and characteristics. For example, the classification component 440 may identify and determine IoT data (e.g., images, video, text data, audio files) associated with the UE 420. In one aspect, the classification component 440 may be remotely located from the UE 420 and/or locally installed on the UE 420 and in communication with intelligent user identification service 410.

The query component 470 may generate one or more user specific verification queries according to the temporary abstraction model. The query/assertion component 470 may assert a user identify for accessing an application upon validating one or more user responses in relation to the one or more user specific verification queries. The query/response component 470 may select data from the temporary abstraction model for generating the one or more user specific verification queries. More specifically, the query/response component 470 may select a category, a type of data, and a linguistic analysis result and semantic analysis result for generating the one or more user specific verification queries. Thus, the query/response component 470 may generate one or more user specific verification queries (e.g., queries customized to the user) by selecting customized, user specific verification queries having answers contained in the temporary abstraction model built from one or more IoT computing devices specific to the user.

The query/response component 470 may issues and provide/generate one or more user specific verification queries. The user may respond to each one of the or more user specific verification queries. The machine learning component 480 may use one or more machine learning operations such as, for example, a linguistic analysis and semantic analysis on each of the responses to the one or more user specific verification queries. The query/response component 470 may then compare one or more user responses to the one or more user specific verification queries.

The query/response component 470 may determine an assertion score according to the comparing. The user identity may be asserted if the assertion score is equal to or greater than a predetermined threshold. The query/response component 470 may be remotely located from the UE 420 and/or locally installed on the UE 420 and in communication with the intelligent user identification service 410.

In view of the foregoing, consider the intelligent user identification service 410 in operation according to the following example illustrated in FIG. 4. The UE 420 (e.g., IoT device) may capture an image. In block 424, the content (e.g., the captured image) on the UE 420 may be analyzed. The analyzed content may be categorized and annotated to a temporary abstraction model with the categorized content, as in block 426. User specific verification queries may be formulated to include answers (to the queries) in the temporary abstraction models, as in block 428. A user may be queried with the user specific verification queries, as in block 430. The user responses may be compared with answers, listed in the temporary abstraction models, associated with the user specific verification queries, as in block 432. The user identity may be asserted upon validating the user responses, as in block 434.

Returning now to the machine learning component 480, feedback may be collected to learn and improve the personalization and/or customization of user specific verification queries for each user and to improve the accuracy of the intelligent user identification service 410. In one aspect, the machine learning component 480 may employ and run NLP and AI tools against the data sources and learn the data content such as, for example, data (e.g., images, video, audio data) of UE 420. That is, the machine learning component 480 may learn different sets of data and may use the AI to make cognitive associations or links between one or more users, activities, behaviors, relationships, responsibilities, concepts, methods, features, characteristics, schedules, events, decision elements, alternatives to a decision, alternative options/choices/events, decision criteria, concepts, suggestions and/or an underlying common activity.

It should be noted that as used herein, the machine learning component 480 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

To further illustrate, the operations of the intelligent user identification service 410 in FIG. 4 may be performed in the following four stages such as, for example, stage 1: content analysis, stage 2: content identification and selection, stage 3: user interaction, and/or stage 4: user verification.

Stage 1: Content Analysis

In one aspect, the analysis component 460 may identify and analyze content available on the UE 420 (e.g., smart phone, watch, computer, appliances, etc.). The classification component 440 may perform an initial categorization to group content and characteristics of the content, and create a temporary abstraction model. The abstraction model may include for example, media data (e.g., images, videos, audio data), a log of recently used applications, a log of communications and type of communications, and when the communications occurred. The abstraction model may include usage statistics, involved devices, and/or whether the content has been copied or accessed via another device. The analysis component 460 may perform a semantic and linguistic analysis to further understand the content. Social network data, communication data, and/or historical data can also be included in the analysis to further increase the annotations details.

The temporary abstraction component 475 may include the abstraction model annotating the content assets as appropriate, following the semantic and linguistics analysis. The temporary abstraction component 475 may store the temporary abstraction model on a centralized, remote repository. It should be noted that the content analysis stage may be a repetitive process, either at regular intervals (e.g., scheduled intervals) or when changes are detected in order to keep the temporary abstraction model up to date.

Stage 2: Content Identification and Selection

Upon complete of stage 1, the content captured in the temporary abstraction model may be analyzed and one or more candidates for validation may be selected. The selected content may be an image, video, audio file, email, text message, phone call log, application use record, and/or any statistical information associated with a particular device (e.g., UE 420) and a user represented in the temporary abstraction model.

In one aspect, the intelligent user identification service 410 may receive an external request to further validate a user. Following pre-determined criteria, the intelligent user identification service 410 may select a category, content, and corresponding semantic and linguistic analysis results from a repository. The selection criteria may involve selecting a different category and involve more than one device, but no more than one content asset per category. Using semantic and linguistic engines, the intelligent user identification service 410 may analyze the corresponding annotations from the temporary abstraction model and formulate a series of questions whose answers are represented in the annotated content. Essentially, in the understanding of the content asset, the query/response component 470 transmits those questions to a requesting external system. In one aspect, the user specific verification queries may include, for example, the following queries: "describe the objects from the second oldest picture in your camera roll," "what was the first application you used on your smart phone today?," "Around what time did you last check your email?," "When was the last time you used your GPS in your smart watch?," Who did you call last on telecommunication application/video streaming service from your smart phone?," How much storage is taken up on device A?, "How many contacts do you have?," "How many photos?," "How much storage is used for photos/videos?"

Stage 3: User Interaction

Upon completion of state 2, the external system may receive the intelligent user identification service 410 having a set of questions via the query/response component 470 for the user to answer. Those answers may be validated at a later state/time period. It should be noted that an external system receives, via the intelligent user identification service 410, a validation unique validation questions specific to that one user. The external system presents the question to the user and captures the user's answer. The external system transmits the answers to the centralized system and waits for user validation confirmation.

Stage 4: User Notification

The intelligent user identification service 410 may receive the validation answers. The intelligent user identification service 410 may perform a semantic and linguistic analysis over the user response/answer, abstracts key elements in the response/answer and derives a unique quotient corresponding to that answer. The intelligent user identification service 410 may repeat such analysis over the content on the central repository that was used to formulate the validation questions. The intelligent user identification service 410 may compare both quotients and uses a confidence level to issue an assertion score to the comparison. The intelligent user identification service 410 may repeat the analysis and comparison for each answer. The intelligent user identification service 410 may consolidate the assertion scores and transmits the results to the external system. If the assertion score is below certain acceptability threshold, the central system red-flags the user validation. At this point the external system would start the process again and a new set of questions will be formulated which will require new set of answers.

Figure 5:
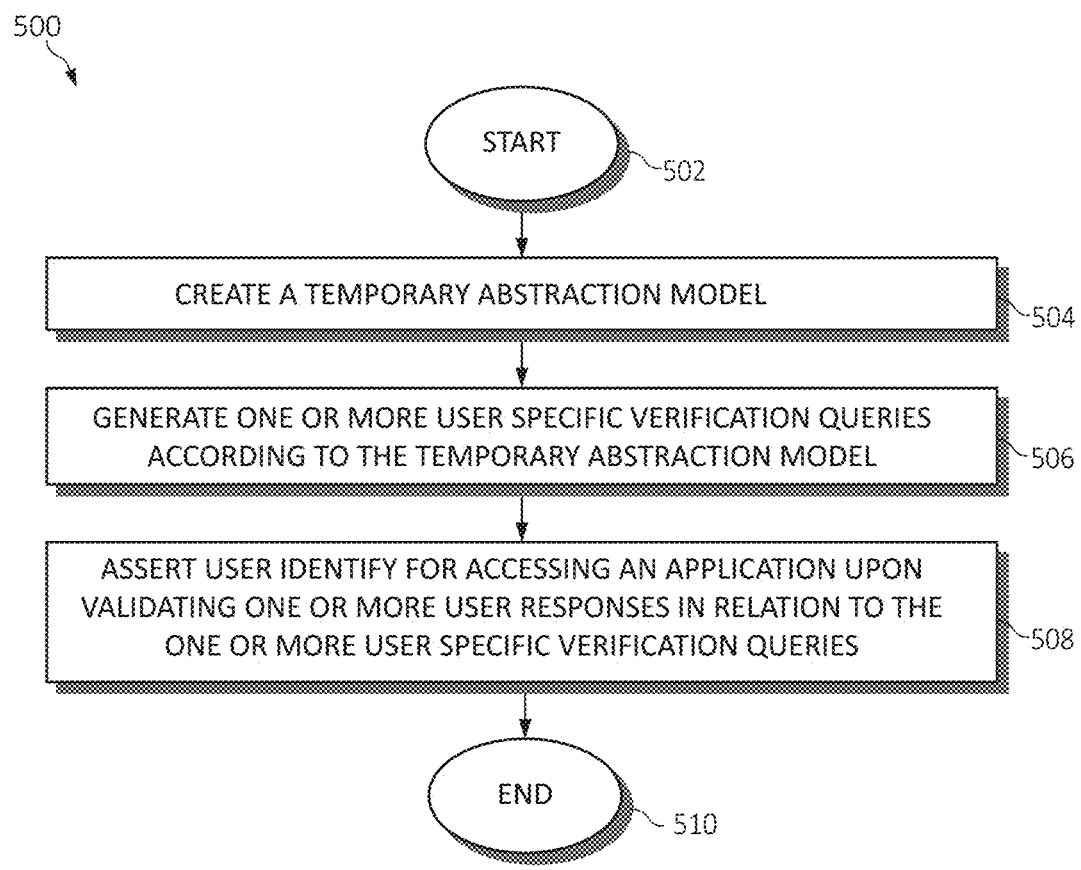
FIG. 5 is a flowchart diagram depicting an additional exemplary method for implementing intelligent user identification by a processor, again in which aspects of the present invention may be realized.

Turning now to FIG. 5, a method 500 for implementing intelligent user identification by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502.

A temporary abstraction model may be created, as in block 504. One or more user specific verification queries may be generated according to the temporary abstraction model, as in block 506. A user identify may be asserted for accessing an application upon validating one or more user responses in relation to the one or more user specific verification queries, as in block 508. The functionality 500 may end, as in block 510.

Figure 6:
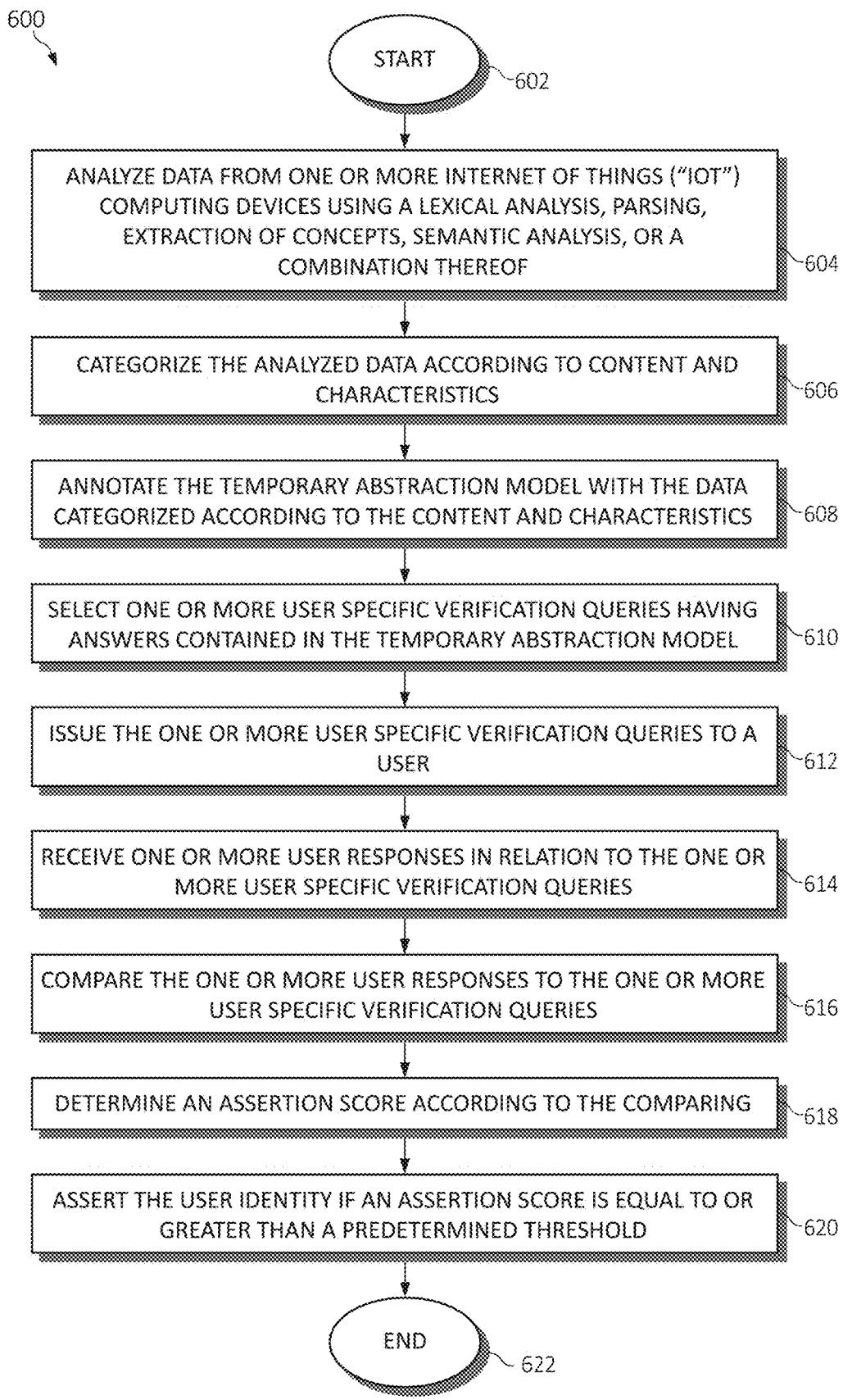
FIG. 6 is an additional flowchart diagram depicting an additional exemplary method for implementing intelligent user identification by a processor, again in which aspects of the present invention may be realized.

Turning now to FIG. 6, a method 600 for implementing intelligent user identification by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

Data from one or more IoT computing devices may be analyzed using a lexical analysis, parsing, extraction of concepts, semantic analysis, or a combination thereof, as in block 604. The analyzed data may be categorized according to content and characteristics, as in block 606. The temporary abstraction model may be annotated with the data categorized according to the content and characteristics, as in block 608. One or more user specific verification queries having answers contained in the temporary abstraction model may be selected, as in block 610. The one or more user specific verification queries may be issued to a user, as in block 612. One or more user responses may be received from the user in relation to the one or more user specific verification queries, as in block 614. The one or more user responses may be compared to the one or more user specific verification queries, as in block 616. An assertion score may be determined according to the comparing, as in block 618. The user identity may be asserted if an assertion score is equal to or greater than a predetermined threshold, as in block 620. The functionality 600 may end, as in block 622.

In one aspect, in conjunction with and/or as part of at least one block of FIGS. 5-6, the operations of methods 500 and 600 may include each of the following. The operations of methods 500 and 600 may select a category, a type of data, and a linguistic analysis result and semantic analysis result for generating the one or more user specific verification queries. Also, the operation of generating the one or more user specific verification queries may also include selecting one or more user specific verification queries having answers contained in the temporary abstraction model.

The operations of methods 500 and 600 may perform a linguistic analysis and semantic analysis on one or more responses to the one or more user specific verification queries, compare the one or more user responses to the one or more user specific verification queries, and/or determine an assertion score according to the comparing. The operations of methods 500 and 600 may user identity if an assertion score is equal to or greater than a predetermined threshold and if the assertion score is less than a predetermined threshold, may return and update user specific verification queries.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing intelligent user identification by a processor, comprising:
   creating a temporary abstraction model, wherein creating the temporary abstraction model includes analyzing data from one or more Internet of Things ("IoT") computing devices using a lexical analysis, parsing, extraction of concepts, semantic analysis, or a combination thereof;
   generating one or more user specific verification queries according to the temporary abstraction model;
   performing a linguistic analysis and semantic analysis on one or more user responses to the one or more user specific verification queries to derive a first unique quotient from the one or more user responses;
   responsive to deriving the first unique quotient from the one or more user responses, re-analyzing the data from the one or more IoT computing devices using the lexical analysis, parsing, extraction of concepts, semantic analysis, or the combination thereof to derive a second unique quotient of the one or more specific verification queries;
   comparing the first unique quotient of the one or more user responses to the second unique quotient of the one or more user specific verification queries to validate the one or more user responses; and
   asserting user identify for accessing an application upon validating the one or more user responses in relation to the one or more user specific verification queries.

2. The method of claim 1, further including:
   categorizing the analyzed data according to content and characteristics; and
   annotating the temporary abstraction model with the data categorized according to the content and characteristics.

3. The method of claim 1, further including selecting data from the temporary abstraction model for generating the one or more user specific verification queries.

4. The method of claim 1, further including selecting a category, a type of data, and a linguistic analysis result and semantic analysis result for generating the one or more user specific verification queries.

5. The method of claim 1, wherein generating the one or more user specific verification queries further includes selecting one or more user specific verification queries having answers contained in the temporary abstraction model.

6. The method of claim 1, further including
determining an assertion score according to the comparing of the first unique quotient to the second unique quotient.

7. The method of claim 6, further including asserting the user identity when the assertion score is equal to or greater than a predetermined threshold.

8. A system for implementing intelligent user identification, comprising:
one or more computers with executable instructions that when executed cause the system to:
create a temporary abstraction model, wherein creating the temporary abstraction model includes analyzing data from one or more Internet of Things ("IoT") computing devices using a lexical analysis, parsing, extraction of concepts, semantic analysis, or a combination thereof;
generate one or more user specific verification queries according to the temporary abstraction model;
perform a linguistic analysis and semantic analysis on one or more user responses to the one or more user specific verification queries to derive a first unique quotient from the one or more user responses;
responsive to deriving the first unique quotient from the one or more user responses, re-analyze the data from the one or more IoT computing devices using the lexical analysis, parsing, extraction of concepts, semantic analysis, or the combination thereof to derive a second unique quotient of the one or more specific verification queries;
compare the first unique quotient of the one or more user responses to the second unique quotient of the one or more user specific verification queries to validate the one or more user responses; and
assert user identify for accessing an application upon validating the one or more user responses in relation to the one or more user specific verification queries.

9. The system of claim 8, wherein the executable instructions further:
categorize the analyzed data according to content and characteristics; and
annotate the temporary abstraction model with the data categorized according to the content and characteristics.

10. The system of claim 8, wherein the executable instructions further select data from the temporary abstraction model for generating the one or more user specific verification queries.

11. The system of claim 8, wherein the executable instructions further select a category, a type of data, and a linguistic analysis result and semantic analysis result for generating the one or more user specific verification queries.

12. The system of claim 8, wherein, pursuant to generating the one or more user specific verification queries, the executable instructions further select one or more user specific verification queries having answers contained in the temporary abstraction model.

13. The system of claim 8, wherein the executable instructions further
determine an assertion score according to the comparing.

14. The system of claim 13, wherein the executable instructions further assert the user identity when the assertion score is equal to or greater than a predetermined threshold.

15. A computer program product for implementing intelligent user identification by a processor, the computer program product comprising a non-transitory computer-readable storage medium having computer-readable program code portions stored therein, the computer-readable program code portions comprising:
an executable portion that creates a temporary abstraction model, wherein creating the temporary abstraction model includes analyzing data from one or more Internet of Things ("IoT") computing devices using a lexical analysis, parsing, extraction of concepts, semantic analysis, or a combination thereof;
an executable portion that generates one or more user specific verification queries according to the temporary abstraction model;
an executable portion that performs a linguistic analysis and semantic analysis on one or more user responses to the one or more user specific verification queries to derive a first unique quotient from the one or more user responses;
an executable portion that, responsive to deriving the first unique quotient from the one or more user responses, re-analyzes the data from the one or more IoT computing devices using the lexical analysis, parsing, extraction of concepts, semantic analysis, or the combination thereof to derive a second unique quotient of the one or more specific verification queries;
an executable portion that compares the first unique quotient of the one or more user responses to the second unique quotient of the one or more user specific verification queries to validate the one or more user responses; and
an executable portion that asserts user identify for accessing an application upon validating one or more user responses in relation to the one or more user specific verification queries.

16. The computer program product of claim 15, further including an executable portion that:
categorizes the analyzed data according to content and characteristics; and
annotates the temporary abstraction model with the data categorized according to the content and characteristics.

17. The computer program product of claim 15, further including an executable portion that selects data from the temporary abstraction model for generating the one or more user specific verification queries.

18. The computer program product of claim 15, further including an executable portion that selects a category, a type of data, and a linguistic analysis result and semantic analysis result for generating the one or more user specific verification queries.

19. The computer program product of claim 15, further including an executable portion that, pursuant to generating the one or more user specific verification queries, selects one or more user specific verification queries having answers contained in the temporary abstraction model.

20. The computer program product of claim 15, further including an executable portion that:
determines an assertion score according to the comparing; and
asserts the user identity when the assertion score is equal to or greater than a predetermined threshold.

* * * * *